US006785340B1

(12) United States Patent
Stockman et al.

(10) Patent No.: US 6,785,340 B1
(45) Date of Patent: Aug. 31, 2004

(54) PCM UPSTREAM AND DOWNSTREAM SYSTEM FOR UNIVERSAL DIGITAL LOOP CARRIER

(75) Inventors: John F. Stockman, Corona Del Mar, CA (US); David M. Motley, Santa Ana, CA (US); Richard A. Kolbush, Raleigh, NC (US); Robert Kroninger, Wake Forest, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 0 days.

(21) Appl. No.: 09/579,077

(22) Filed: May 25, 2000

(51) Int. Cl.[7] .............................................. H04L 27/00
(52) U.S. Cl. ...................................... 375/259; 375/245
(58) Field of Search ................................ 375/219, 220, 375/222, 242, 259, 245, 288, 295, 316, 296, 229; 379/387.02, 399.01, 402

(56) References Cited

U.S. PATENT DOCUMENTS

| 4,263,670 A | * | 4/1981 | Sherman ...................... 375/223 |
| 5,170,396 A | * | 12/1992 | Rivers et al. ................ 714/709 |
| 5,249,268 A | * | 9/1993 | Doucet ........................ 709/230 |
| 5,373,508 A | * | 12/1994 | Guliani ........................ 714/712 |
| 5,471,630 A | * | 11/1995 | Otsuka ........................ 710/58 |
| 5,479,480 A | * | 12/1995 | Scott ........................... 455/425 |
| 5,574,940 A | * | 11/1996 | Otsuka ........................ 712/42 |
| 6,201,830 B1 | * | 3/2001 | Chellali et al. ............. 375/222 |
| 6,345,072 B1 | * | 2/2002 | Liu et al. .................... 375/222 |
| 2002/0061061 A1 | * | 5/2002 | Young et al. ................ 375/222 |
| 2002/0064222 A1 | * | 5/2002 | Liu et al. .................... 375/222 |
| 2002/0080869 A1 | * | 6/2002 | Young et al. ................ 375/222 |
| 2004/0028159 A1 | * | 2/2004 | Abdelilah et al. .......... 375/350 |

FOREIGN PATENT DOCUMENTS

| WO | WO 99 18712 A | 4/1999 |
| WO | WO 99/30449 | 6/1999 |

OTHER PUBLICATIONS

Federal Communications Commission, "1998 Biennial Regulatory Review—Modifications to signal power limitations contained in part 68 of the commission's Rules", vol. 98–163, Sep. 16, 1998, pp. 1–5.

* cited by examiner

*Primary Examiner*—Jean B. Corrielus
(74) *Attorney, Agent, or Firm*—Fogg and Associates, LLC; Jon M. Powers

(57) ABSTRACT

A central office line unit (COLU) for a pulse code modulation (PCM) upstream and downstream system in a universal digital loop carrier (UDLC) includes a hybrid circuit for transmitting/receiving an analog signal to/from a switch. An analog-to-digital converter is provided for receiving the analog signal from the hybrid circuit and converting the analog signal to a converted digital signal. A digital transmission circuit transmits/receives a digital signal to/from a remote terminal. A quantizer is provided for evaluating and processing the converted digital signal so that only valid states of the converted digital signal are transmitted to the digital transmission circuit for transmission to the remote terminal. A receiver is used for receiving the digital signal from the digital transmission circuit and for evaluating and processing the digital signal so that only valid states of the digital signal are outputted from the receiver. A transmitter receives the digital signal from the receiver and equalizes the digital signal. And, a digital-to-analog converter converts the equalized digital signal to a converted analog signal and transmits the converted analog signal to the hybrid circuit, which transmits the converted analog signal to the switch.

44 Claims, 3 Drawing Sheets

UNIVERSAL DIGITAL LOOP CARRIER SYSTEM

PCM UPSTREAM AND DOWNSTREAM SYSTEM FOR UNIVERSAL DIGITAL LOOP CARRIER

BACKGROUND OF THE INVENTION

Currently, a conventional 56K analog modem for making connections over an analog plain old telephone system (POTS) line may use the V.90 standard, which refers to the International Telecommunication Union specification (ITU) V.90 series 1, announced on Feb. 6, 1998. A V.90 modem uses pulse code modulation (PCM) in the downstream direction (receiving direction) to achieve up to 56K bits-per-second data speed. FIG. 1 illustrates a prior art connection between analog modems 120 and a digital modem 100. The modems 100,120 are connected through an intermediary telephone switch 110, such as a standard class 5 switch at the telephone system office. That is, the analog modem at the user end dials a number and connects to the class 5 switch, which is then connected to the digital modem at the Internet Service Provider (ISP) end via a digital serial data link line, such as a T1 connection.

Telephone systems employing a universal digital loop carrier (UDLC) system are unable to make V.90 (PCM downstream) modem connections. Very often in UDLC connections, a central office line unit (COLU) and a remote terminal (RT) are added in the telephone connection path (see, for example. FIG. 2). Because there are two analog signal paths along the two analog POTS line connections (between the analog modems and the remote terminal, and between the COLU and the telephone switch), V.90 connections are not possible without further modification of the UDLC system because of the line noise and other factors that may distort the signal. In order to overcome this limitation, manufacturers of UDLC systems have added in their UDLC equipment a downstream equalizer, a downstream canceller, and an upstream canceller to improve the chances of making proper V.90 PCM connections. V.90 series 1 modems have a PCM modem only in the downstream direction, and use a slower analog modem in the upstream direction. However, even if analog modems are later developed utilizing a protocol where PCM signals are also transmitted in the upstream direction, current UDLC systems are not adapted to handle upstream PCM signals.

SUMMARY OF THE INVENTION

According to an embodiment of the present invention, a central office line unit (COLU) for a pulse code modulation (PCM) upstream and downstream system in a universal digital loop carrier (UDLC) includes a hybrid circuit for transmitting/receiving an analog signal to/from a switch. An analog-to-digital converter is provided for receiving the analog signal from the hybrid circuit and converting the analog signal to a converted digital signal. A digital transmission circuit, such as a high-speed digital subscriber line (HDSL) circuit transmits/receives a digital signal to/from a remote terminal. A quantizer is provided for evaluating and processing the converted digital signal so that only valid states of the converted digital signal are transmitted to the digital transmission circuit for transmission to the remote terminal. A receiver is used for receiving the digital signal from the digital transmission circuit and for evaluating and processing the digital signal so that only valid states of the digital signal are outputted from the receiver. A transmitter receives the digital signal from the receiver and equalizes the digital signal prior to transmitting the digital signal to a digital-to-analog converter. The digital-to-analog converter converts the digital signal to a converted analog signal and transmits the converted analog signal to the hybrid circuit, which transmits the converted analog signal to the switch.

According to another embodiment of the present invention, a central office line unit (COLU) for a pulse code modulation (PCM) upstream and downstream system in a universal digital loop carrier (UDLC) includes a hybrid circuit for transmitting/receiving an analog signal to/from a switch. An analog-to-digital converter is provided for receiving the analog signal from the hybrid circuit and converting the analog signal to a converted digital signal. A digital transmission circuit transmits/receives a digital signal to/from a remote terminal. A quantizer is provided for evaluating and processing the converted digital signal so that only valid states of the converted digital signal are transmitted to the digital transmission circuit for transmission to the remote terminal.

According to another embodiment of the present invention, a central office line unit (COLU) for a pulse code modulation (PCM) upstream and downstream system in a universal digital loop carrier (UDLC) includes a hybrid circuit for transmitting/receiving an analog signal to/from a switch. An digital transmission circuit transmits/receives a digital signal to/from a remote terminal. A receiver is provided for receiving the digital signal from the digital transmission circuit and for evaluating and processing the digital signal so that only valid states of the digital signal are outputted from the receiver. A transmitter is provided for receiving the digital signal from the receiver and for equalizing the digital signal. A digital-to-analog converter converts the equalized digital signal to a converted analog signal. The converted analog signal is sent to the hybrid circuit, which transmits the converted analog signal to the switch.

According to another embodiment of the present invention, a remote terminal for a pulse code modulation (PCM) upstream and downstream system in a universal digital loop carrier (UDLC) includes a receiver for receiving a digital signal converted from an analog signal of an analog modem, and for evaluating and processing the digital signal so that only valid states of the digital signal are outputted from the receiver. A transmitter is provided for receiving the digital signal from the receiver, and for equalizing the digital signal prior to transmitting the digital signal to a digital-to-analog converter in a central office line unit (COLU).

According to another embodiment of the present invention, a pulse code modulation (PCM) upstream and downstream system in a universal digital loop carrier (UDLC) includes at least one analog modem connected to an analog plain old telephone system (POTS) line. A remote terminal is connected to the analog modem via the analog POTS line and further connected to a high-speed digital subscriber line. A central office line unit is provided, which includes a hybrid circuit for transmitting/receiving an analog signal to/from a switch. The switch is connected to the hybrid circuit via a second analog plain old telephone system (POTS) line. An analog-to-digital converter is provided for receiving the analog signal from the hybrid circuit and converting the analog signal to a converted digital signal. A digital transmission circuit transmits/receives a digital signal to/from the remote terminal. A quantizer is provided for evaluating and processing the converted digital signal so that only valid states of the converted digital signal are transmitted to the digital transmission circuit for transmission to the remote terminal. A receiver receives the digital signal from the digital transmission circuit, and evaluates and processes the digital signal so that only valid states of the digital signal are outputted from the receiver. A transmitter is provided for receiving the digital signal from the receiver, and for equalizing the digital signal. A digital-to-analog converter converts the digital signal to a converted analog signal and transmits the converted analog signal to the hybrid circuit, which transmits the converted analog signal to the switch via the second analog POTS line. A digital modem is connected to the switch via a digital serial data link line.

According to another embodiment of the present invention, a method of transmitting a downstream pulse code modulation (PCM) signal in a PCM upstream and downstream system in a universal digital loop carrier (UDLC) includes receiving a downstream digital signal from an analog-to-digital converter. The downstream digital signal is evaluated for an invalid state not designated by the PCM upstream and downstream system. Then, the downstream digital signal is processed so that only valid states designated by the PCM upstream and downstream system are transmitted downstream.

According to yet another embodiment of the present invention, a method of transmitting an upstream pulse code modulation (PCM) signal in a PCM upstream and downstream system in a universal digital loop carrier (UDLC) includes receiving an upstream digital signal from an analog-to-digital converter. The upstream digital signal is evaluated for invalid states not designated by the PCM upstream and downstream system. The upstream digital signal is processed so that only valid states designated by the PCM upstream and downstream system are transmitted. The upstream digital signal is equalized and then transmitted upstream.

DETAILED DESCRIPTION

Figure 1:
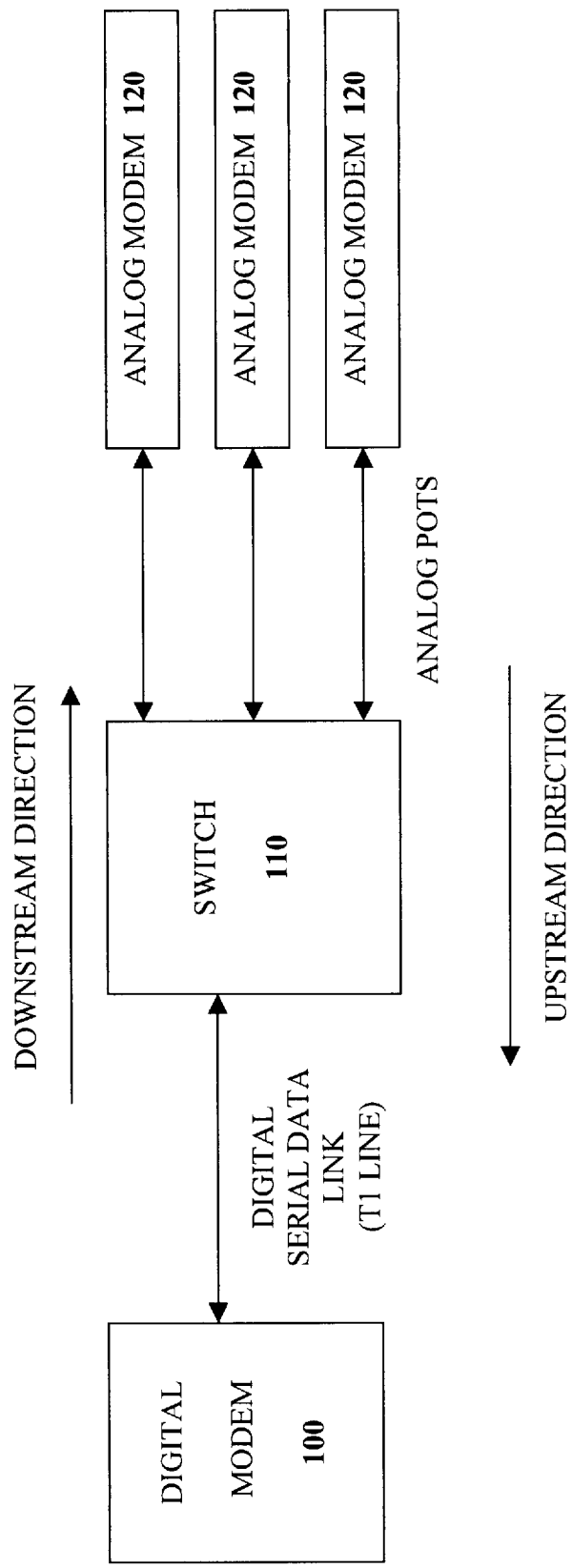
FIG. 1 illustrates a prior art connection utilizing a conventional connection to a telephone company switch for access to a digital modem.
Figure 2:
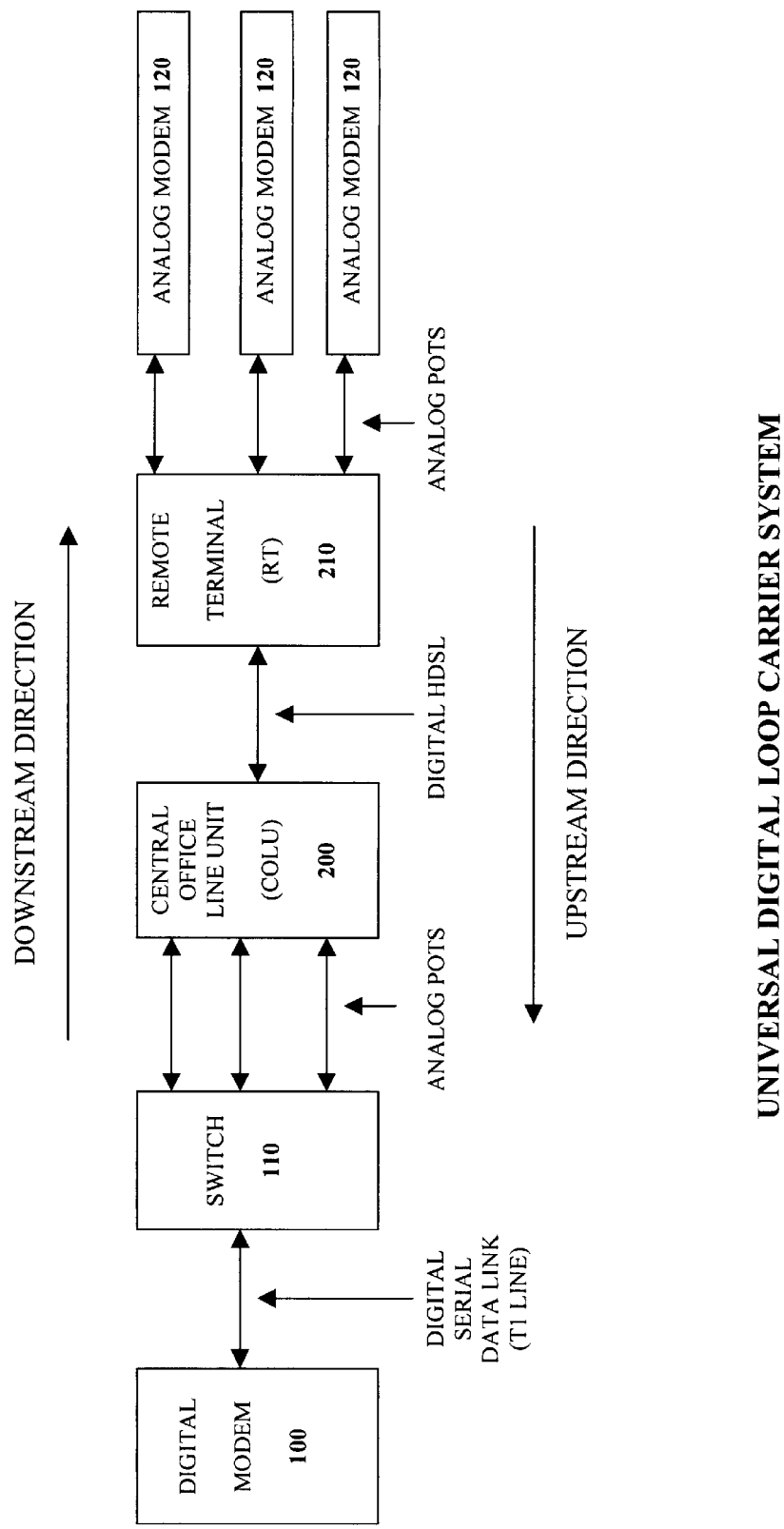
FIG. 2 illustrates a connection utilizing a universal digital loop carrier (UDLC) system according to an embodiment of the present invention.

As illustrated in FIG. 2, the central office line unit (COLU) 200 is a component of the UDLC system, which may also include a remote terminal 210 and analog modems 120 on the downstream end of the COLU 200, as well as a switch 110 and a digital modem 100 on the upstream end of the COLU 200.

Figure 3:
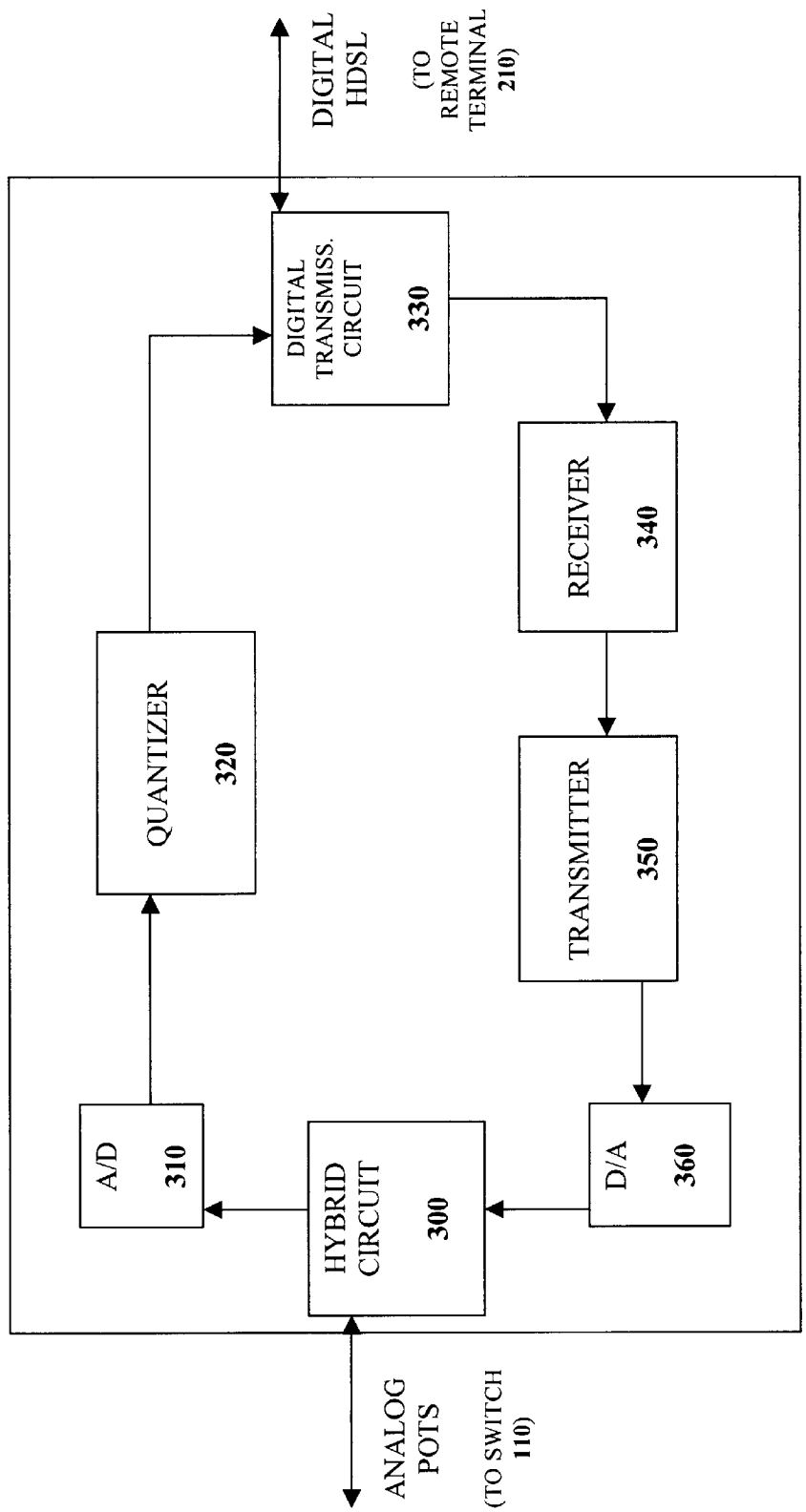
FIG. 3 illustrates a central office line unit (COLU) for a universal digital loop carrier (UDLC) system according to an embodiment of the present invention.

FIG. 3 illustrates a central office line unit (COLU) for a universal digital loop carrier (UDLC) system according to an embodiment of the present invention. A PCM upstream and downstream system for a Universal Digital Loop Carrier (UDLC) system preferably includes a central office line unit (COLU) 200 having a digital transmission circuit 330, such as a high-speed digital subscriber line (HDSL) circuit or any other digital transmission device, for transmitting/receiving digital signals (such as HDSL signals) to/from a remote terminal 210. FIG. 3 illustrates only one channel, but a UDLC system may have multiple channels.

Referring to FIG. 2, a plurality of signals from different channels coming from the remote terminal 210 may be time-division multiplexed into a single HDSL signal line transmitted to the COLU 200. The remote terminal 210 provides the HDSL signals by converting analog signals carried over the analog POTS lines transmitted from the analog modems 120 at the user end. An analog-to-digital converter (not shown) within the remote terminal 210 converts the analog signal received from an analog modem 120 into a digital signal for transmission to the COLU 200. The analog modems 120 may be those utilizing the ITU adopted V.90 standard, and/or other standards, such as the proposed V.92 standard, also known as the "V.90 series 2" standard, which allows for PCM downstream and upstream capability. The V.92 standard incorporates the V.90 protocol, with the addition of using the same type of pulse code modulation (PCM) in the upstream direction. The current V.90 standard utilizes the V.34 protocol for analog upstream transmissions, which is limited to a data transfer rate of about 33.6K bits-per second.

According to the V.90 standard, the PCM signals that are transmitted can be any one of 256 available states (voltages), providing for an 8-bit data signal to be transmitted. The 8-bit data signals may be transmitted at a rate of approximately 1/8000 of a second. Therefore, in one second, the V.90 standard has a theoretical transfer rate of approximately 64,000 bits-per-second. However, due to the nature of telephone lines (with distortion and noise), many of the 256 states are prone to errors (especially when utilizing states that are close to each other). Therefore, in order to provide more reliable transmissions, typically only about half (128) of the total available states are utilized for transmissions, with the other half being unused. Due to FCC power regulations, not all of the states are available for transmission over existing telephone lines, which therefore limits the maximum transfer rate to approximately 53,000 bits-per-second.

During the startup procedure for the connection between an analog modem 120 and the digital modem 100 under the V.90 protocol, the analog modem 120 sends to the digital modem 100 instructions (known as a "preamble"), which include a set of the valid states (from among the entire 256 states) that the analog modem 120 will utilize to transmit and receive data. The analog modems 120 may make such a determination of the set of valid states to be utilized by first sending signals for all of the states during the startup initialization, and then selecting the optimal states to be used based on the particular condition of the connection of the line. In other words, the analog modem 120 determines the line impairments and then selects the set of optimal states to be used and informs the digital modem 100 of the same. The digital modem 100 is entirely passive during this procedure, and accepts the instructions from the analog 120 modem regarding what particular states are to be utilized in the set. Depending on the particular modem manufacturer and the condition of the telephone line at any given time, the set of valid states may vary from modem to modem. That is, two different analog modems 120 may utilize the same number of states (for example, 128) for a particular set of states over a telephone line having a particular condition, but, the exact states used to make up the 128 states may be different from each other.

Once a specific set of states has been established between the analog modem 120 and the digital modem 100 via the instructions in the preamble, the modems 100,120 will only look for the valid states when it transmits and receives the signals. The modems 100,120 will not look for invalid states. By narrowing down the reception and transmission of the total possible states to only the valid states, efficiency between the modems 100,120 is improved.

Negotiation between the analog modem 120 and the digital modem 100 may also occur after the startup initialization has been completed (i.e., "retraining" or "renegotiation" may occur between the analog modem 120 and the digital modem 100 after startup), thereby changing the "set" of valid states used. Retraining may occur, for example, due to a change in the condition of the line connection, which may allow for more states to be utilized, or a lesser number of states to be utilized.

As shown in FIG. 3, a hybrid circuit 300 (such as a duplexer) is adapted to transmit/receive signals to/from the analog POTS line, which is ultimately connected to the digital modem 100 at the Internet Service Provider (ISP) end. Typically with hybrid circuits 300, another port, such as a termination end, is associated with the hybrid circuit 300 to keep the lines at a matched impedance. The digital modem 100 at the ISP end may also be compatible with the V.92 standard, and/or any other standard that allows for PCM downstream and upstream capability. The hybrid circuit 300 is adapted to receive signals from the analog POTS line and transmit the signals to an analog-to-digital converter 310 within the COLU 200. The analog-to-digital converter 310 converts the analog signals to digital signals, and then sends the digital signals to a quantizer 320.

The quantizer 320, in accordance with the protocol standard utilized (such as the V.90 or V.92 protocol for PCM downstream transmissions), is adapted to make decisions on the signals received from the analog-to-digital converter 310 and to send the quantized signals to the digital transmission circuit 330 for ultimate transmission to the analog modem 120. More specifically, based on the particular set of valid states designated by the analog modem 120 during the startup initialization discussed above, the quantizer 320 ensures that only valid state signals are passed on downstream to the digital transmission circuit 330, and ultimately to the analog modem 120. Because the set of valid states were assigned when the modems 100,120 were first connected during startup, the quantizer 320 is aware of the valid states being used and ensures that only the signals within the valid states are transmitted downstream from the quantizer 320.

If an error occurs so that a signal is transmitted in an "invalid" state, or due to noise on the line a signal is transformed into an invalid state, the quantizer 320 makes an evaluation of the signal in the invalid state and locates the "closest" acceptable valid state from which the invalid state was likely deviated. The quantizer 320 then converts the invalid state signal to that of a valid state, and transmits the valid state signal downstream to the digital transmission circuit 330, and ultimately to the analog modem 120.

For example, the quantizer 320 receives a signal having a state of "76" (out of possible states 1 to 256, of which only half of are utilized), and from the startup procedure, it was determined that "76" was not a valid state, and that the closest valid states are "74" and "82". The quantizer 320 makes a determination by making an educated guess—locating the "closest" valid state for the given signal (which is "74")—and then transforms the invalid state signal to one of a valid state signal, in this case, a valid state of "74". By utilizing the quantizer 320, the signals are essentially filtered so that only the valid state signals are transmitted to the analog modem 120, minimizing the likelihood that invalid states are passed down to the remote terminal 210, and ultimately, to the analog modem 120. Because the analog modem 120 is only looking for signals in a valid state, any other transmitted state may cause data to be lost. Additionally, the quantizer 320 may also perform an equalization function to equalize the signals to better maintain the integrity of the data within the signals. Prior to the quantizer 320, the signal is passed through an equalizer. The equalizer is a filter designed with characteristics that minimize delay and amplitude distortions at the quantizer's 320 input.

The digital transmission circuit 330 receives the quantized signals from the quantizer 320 and functions as a "formatter" or "framer" for serially framing the data stream into 8-bit frames for transmission to the remote terminal 210. Because the signals to the remote terminal 210 may be for multiple channels (which are time-division multiplexed), the digital transmission circuit 330 is adapted to determine which of the 8-bit frames are for a particular channel when transmitting to the remote terminal 210. Therefore, a serial digital data stream having 8-bit frames is sent from the COLU 200 to the remote terminal 210, in the same format as the data sent upstream from the remote terminal 210 to the COLU 200.

The digital transmission circuit 330 is also adapted to receive digital signals (in the format described above) from the remote terminal 210. A digital signal is received by the digital transmission circuit 330 and transmitted to the receiver 340. The receiver 340 performs according to a protocol standard that allows for transmission of PCM signals in the upstream direction, such as the V.92 standard, or other applicable standards. The receiver 340 functions similarly to the quantizer 320 discussed above. The receiver 340 acts as a filter to ensure that only valid states are sent upstream to the digital modem 100. The digital modem 100 is looking only for signals in a valid state, and any other transmitted state may cause data to be lost. Due to the analog-to-digital signal conversion process (at the remote terminal 210) of the signal transmitted from the analog modem 120, errors, particularly quantization noise resulting from the analog-to-digital conversion, may be introduced into the signal so as to displace a valid state signal to one of an invalid state. Like the quantizer 320 above, the receiver 340 makes an evaluation of the signals for any invalid state signals. For any signal found in an invalid state, the "closest" acceptable valid state for that signal is determined, and the receiver 340 converts the invalid state signal to a valid state signal. The receiver 340 may also perform echo detection and echo cancellation on the incoming signals from the digital transmission circuit 330 so as to improve the quality of the signal when it is sent to the transmitter 350.

The transmitter 350 functions to prepare the valid signals received from the receiver 340 for proper conversion from a digital signal to an analog signal by the digital-to-analog converter 360 upstream from the transmitter 350. More specifically, the transmitter 350 serves as a pre-equalizer and pre-filter to pre-equalize the signal so that the signal may be properly converted by the digital-to-analog converter 360 into an analog signal for transmission to the switch 110 along the analog POTS lines. A timing phase shift may also be performed on the signals, if required, to present the signals in a proper format to the digital-to-analog converter 360.

The signals (now converted to analog) are then sent from the digital-to-analog circuit 360 to the hybrid circuit 300, which processes the analog signals for transmission along the analog POTS line, which leads to the switch 110. The switch may be typical telephone switching equipment (a class 5 switch) used at the telephone company's central office. The switch 110 is adapted to receive and transmit signals between the digital modem 100, via, for example, a digital serial data link (T1 line) connected between the digital modem 100 and the switch 110.

In an alternative embodiment of the present invention, the receiver 340 and the transmitter 350 described above may be located within the remote terminal 210 rather than in the COLU 200 so that the signal quantizing, filtering, and equalizing occurs in the remote terminal 210 prior to reaching the COLU 200. In such case, all that is required by the COLU 200 is to convert the upstream digital signal into an analog signal by the digital-to-analog converter 360 for transmission to the switch 110 along the analog POTS lines.

By utilizing the PCM upstream and downstream system of the present invention, PCM downstream and upstream transmissions from analog modems at the user end are possible, data uploading speeds are greatly improved, and the overall transmission of PCM signals is more efficient and accurate.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A central office line unit (COLU) for a pulse code modulation (PCM) upstream and downstream system in a universal digital loop carrier (UDLC), comprising:

a hybrid circuit for sending and receiving an analog signal to and from a switch;

an analog-to-digital converter for receiving the analog signal from the hybrid circuit and converting the analog signal to a converted digital signal;

a digital transmission circuit for sending and receiving a digital signal to and from a remote terminal;

a quantizer for evaluating and processing the converted digital signal so that only valid states of the converted digital signal are transmitted to the digital transmission circuit for transmission to the remote terminal;

a receiver for receiving the digital signal from the digital transmission circuit and for evaluating and processing the digital signal so that only valid states of the digital signal are outputted from the receiver;

a transmitter for receiving the digital signal from the receiver and for equalizing the digital signal; and a digital-to-analog converter that converts the equalized digital signal to a converted analog signal and transmits the converted analog signal to the hybrid circuit, which transmits the converted analog signal to the switch.

2. The central office line unit (COLU) according to claim 1, wherein the hybrid circuit is connected to the switch via an analog plain old telephone system (POTS) line.

3. The central office line unit (COLU) according to claim 1, wherein the digital transmission circuit is connected to the remote terminal via a high-speed digital subscriber line.

4. The central office line unit (COLU) according to claim 1, wherein the hybrid circuit is a duplexer.

5. The central office line unit (COLU) according to claim 1, wherein the digital transmission circuit is adapted to frame the converted digital signal into 8-bit frames for transmission to the remote terminal.

6. The central office line unit (COLU) according to claim 1, wherein the quantizer equalizes the converted digital signal prior to transmission to the digital transmission circuit.

7. The central office line unit (COLU) according to claim 1, wherein the receiver performs echo detection and echo cancellation on the digital signal prior to transmission to the transmitter.

8. The central office line unit (COLU) according to claim 1, wherein the transmitter filters the digital signal.

9. The central office line unit (COLU) according to claim 1, wherein the transmitter performs a timing phase shift function on the digital signal.

10. A central office line unit (COLU) for a pulse code modulation (PCM) upstream and downstream system in a universal digital loop carrier (UDLC), comprising:

a hybrid circuit for sending and receiving an analog signal to and from a switch;

an analog-to-digital converter for receiving the analog signal from the hybrid circuit and converting the analog signal to a converted digital signal;

a digital transmission circuit for sending and receiving a digital signal to and from a remote terminal; and a quantizer for evaluating and processing the converted digital signal so that only valid states of the converted digital signal are transmitted to the digital transmission circuit for transmission to the remote terminal.

11. The central office line unit (COLU) according to claim 10, wherein the hybrid circuit is connected to the switch via an analog plain old telephone system (POTS) line.

12. The central office line unit (COLU) according to claim 10, wherein the digital transmission circuit is connected to the remote terminal via a high-speed digital subscriber line.

13. The central office line unit (COLU) according to claim 10, wherein the hybrid circuit is a duplexer.

14. The central office line unit (COLU) according to claim 10, wherein the digital transmission circuit is adapted to frame the converted digital signal into 8-bit frames for transmission to the remote terminal.

15. The central office line unit (COLU) according to claim 10, wherein the quantizer equalizes the converted digital signal prior to transmission to the digital transmission circuit.

16. A central office line unit (COLU) for a pulse code modulation (PCM) upstream and downstream system in a universal digital loop carrier (UDLC), comprising:

a hybrid circuit for sending and receiving an analog signal to and from a switch;

a digital transmission circuit for sending and receiving a digital signal from a remote terminal;

a receiver for receiving the digital signal from the digital transmission circuit and for evaluating and processing the digital signal so that only valid states of the digital signal are outputted from the receiver;

a transmitter for receiving the digital signal from the receiver and for equalizing the digital signal; and a digital-to-analog converter that converts the equalized digital signal to a converted analog signal and transmits the converted analog signal to the hybrid circuit, which transmits the converted analog signal to the switch.

17. The central office line unit (COLU) according to claim 16, wherein the hybrid circuit is connected to the switch via an analog plain old telephone system (POTS) line.

18. The central office line unit (COLU) according to claim 16, wherein the digital transmission circuit is connected to the remote terminal via a high-speed digital subscriber line.

19. The central office line unit (COLU) according to claim 16, wherein the hybrid circuit is a duplexer.

20. The central office line unit (COLU) according to claim 16, wherein the digital transmission circuit is adapted to frame the converted digital signal into 8-bit frames for transmission to the remote terminal.

21. The central office line unit (COLU) according to claim 16, wherein the receiver performs echo detection and echo cancellation on the digital signal prior to transmission to the transmitter.

22. The central office line unit (COLU) according to claim 16, wherein the transmitter filters the digital signal.

23. The central office line unit (COLU) according to claim 16, wherein the transmitter performs a timing phase shift function on the digital signal.

24. A remote terminal for a pulse code modulation (PCM) upstream and downstream system in a universal digital loop carrier (UDLC), comprising:
  a receiver for receiving a digital signal converted from an analog signal of an analog modem, and for evaluating and processing the digital signal so that only valid states of the digital signal are outputted from the receiver; and
  a transmitter for receiving the digital signal from the receiver, and for equalizing the digital signal prior to transmitting the digital signal to a central office line unit (COLU).

25. The remote terminal according to claim 24, wherein the remote terminal is connected to the analog modem via an analog plain old telephone system (POTS) line.

26. The remote terminal according to claim 24, wherein the remote terminal is connected to the COLU via a high-speed digital subscriber line.

27. The remote terminal according to claim 24, wherein the receiver performs echo detection and echo cancellation on the digital signal prior to transmission to the transmitter.

28. The remote terminal according to claim 24, wherein the transmitter filters the digital signal.

29. The remote terminal according to claim 24, wherein the transmitter performs a timing phase shift function on the digital signal.

30. A pulse code modulation (PCM) upstream and downstream system in a universal digital loop carrier (UDLC), comprising:
  at least one analog modem connected to an analog plain old telephone system (POTS) line;
  a remote terminal connected to the analog modem via the analog POTS line and further connected to a high-speed digital subscriber line;
  a central office line unit including,
    a hybrid circuit for sending and receiving an analog signal to and from a switch, wherein the switch is connected to the hybrid circuit via a second analog plain old telephone system (POTS) line,
    an analog-to-digital converter for receiving the analog signal from the hybrid circuit and converting the analog signal to a converted digital signal,
    a digital transmission circuit for sending and receiving a digital signal to and from the remote terminal,
    a quantizer for evaluating and processing the converted digital signal so that only valid states of the converted digital signal are transmitted to the digital transmission circuit for transmission to the remote terminal,
    a receiver for receiving the digital signal from the digital transmission circuit, and for evaluating and processing the digital signal so that only valid states of the digital signal are outputted from the receiver,
    a transmitter for receiving the digital signal front the receiver, and for equalizing the digital signal, and
    a digital-to-analog converter that converts the equalized digital signal to a converted analog signal and transmits the converted analog signal to the hybrid circuit, which transmits the converted analog signal to the switch via the second analog POTS line; and
  a digital modem connected to the switch via a digital serial data link line.

31. The PCM upstream and downstream system according to claim 30, wherein the hybrid circuit is a duplexer.

32. The PCM upstream and downstream system according to claim 30, wherein the digital transmission circuit is adapted to frame the converted digital signal into 8-bit frames for transmission to the remote terminal.

33. The PCM upstream and downstream system according to claim 30, wherein the quantizer equalizes the converted digital signal prior to transmission to the digital transmission circuit.

34. The PCM upstream and downstream system according to claim 30, wherein the receiver performs echo detection and echo cancellation on the digital signal prior to transmission to the transmitter.

35. The PCM upstream and downstream system according to claim 30, wherein the transmitter filters the digital signal.

36. The PCM upstream and downstream system according to claim 30, wherein the transmitter performs a timing phase shift function on the digital signal.

37. A method of transmitting a downstream pulse code modulation (PCM) signal in a PCM upstream and downstream system in a universal digital loop carrier (UDLC), the method comprising the steps of:
  receiving a downstream digital signal from an analog-to-digital converter;
  evaluating the downstream digital signal for an invalid state not designated by the PCM upstream and downstream system; and
  processing the downstream digital signal so that only valid states designated by the PCM upstream and downstream system are transmitted downstream.

38. The method of transmitting the downstream PCM signal according to claim 37, wherein the analog-to-digital converter resides in a central office line unit (COLU).

39. The method of transmitting the downstream PCM signal according to claim 37, further including the step of:
  equalizing the downstream digital signal prior to transmission downstream.

40. A method of transmitting an upstream pulse code modulation (PCM) signal in a PCM upstream and downstream system in a universal digital loop carrier (UDLC), the method comprising the steps of:
  receiving an upstream digital signal from an analog-to-digital converter;
  evaluating the upstream digital signal for an invalid state not designated by the PCM upstream and downstream system;
  processing the upstream digital signal so that only valid states designated by the PCM upstream and downstream system are transmitted;
  equalizing the upstream digital signal; and
  transmitting the upstream digital signal upstream.

41. The method of transmitting the upstream PCM signal according to claim 40, wherein the analog-to-digital converter resides in a remote terminal.

42. The method of transmitting the upstream PCM signal according to claim 40, further including the steps of:
  detecting for an echo in the upstream digital signal; and
  canceling the echo in the upstream digital signal.

43. The method of transmitting the upstream PCM signal according to claim 40, further including the step of filtering the upstream digital signal.

44. The method of transmitting the upstream PCM signal according to claim 40, further including the step of performing a timing phase shift function on the upstream digital signal.

* * * * *

UNITED STATES PATENT AND TRADEMARK OFFICE
CERTIFICATE OF CORRECTION

PATENT NO. : 6,785,340 B1 Page 1 of 1
APPLICATION NO. : 09/579077
DATED : August 31, 2004
INVENTOR(S) : Stockman et al.

It is certified that error appears in the above-identified patent and that said Letters Patent is hereby corrected as shown below:

In claim 30, column 9, line 58, please replace "front" with --from--

Signed and Sealed this

Fifteenth Day of January, 2008

JON W. DUDAS
*Director of the United States Patent and Trademark Office*